United States Patent [19]
Wheeler et al.

[11] Patent Number: 5,092,726
[45] Date of Patent: Mar. 3, 1992

[54] SELF-LOCKING FASTENER, FASTENER SYSTEM, AND PROCESS

[75] Inventors: Roland A. Wheeler; Peter M. Downie, both of Los Angeles, Calif.

[73] Assignee: VSI Corporation, Chantilly, Va. ; by said Peter M. Downie

[21] Appl. No.: 384,132

[22] Filed: Jul. 21, 1989

[51] Int. Cl.⁵ .............................................. F16B 39/22
[52] U.S. Cl. ........................................ 411/277; 411/1; 411/336
[58] Field of Search ................ 411/7, 10, 3, 277, 416, 411/281, 276, 2, 1, 5, 167, 176, 281, 283, 284, 8, 278, 282, 265, 937.2, 336

[56] References Cited

U.S. PATENT DOCUMENTS

| | | | |
|---|---|---|---|
| 2,255,286 | 9/1941 | Harvey | 411/282 |
| 2,923,339 | 2/1960 | Skidmore | 411/277 |
| 4,260,005 | 4/1981 | Stencel | 411/416 X |
| 4,408,936 | 10/1983 | Williamson | 411/281 X |
| 4,601,623 | 7/1986 | Wallace | 411/1 X |

FOREIGN PATENT DOCUMENTS

| | | | |
|---|---|---|---|
| 1935 | 5/1979 | European Pat. Off. | 411/7 |
| 60508 | 9/1982 | European Pat. Off. | 411/276 |
| 8705977 | 10/1987 | World Int. Prop. O. | 411/10 |

*Primary Examiner*—Rodney Lindsey
*Attorney, Agent, or Firm*—Christie, Parker & Hale

[57] ABSTRACT

Wrenching lobes of an internally threaded nut are separated by circumferential, tapered walls so that the lobes and contiguous portions of the walls deform in radial compression upon reaching a predetermined preload and displace radially inwardly while the central portions of the walls deform radially outwardly, but do not interfere with the tool that sets the nut.

10 Claims, 1 Drawing Sheet

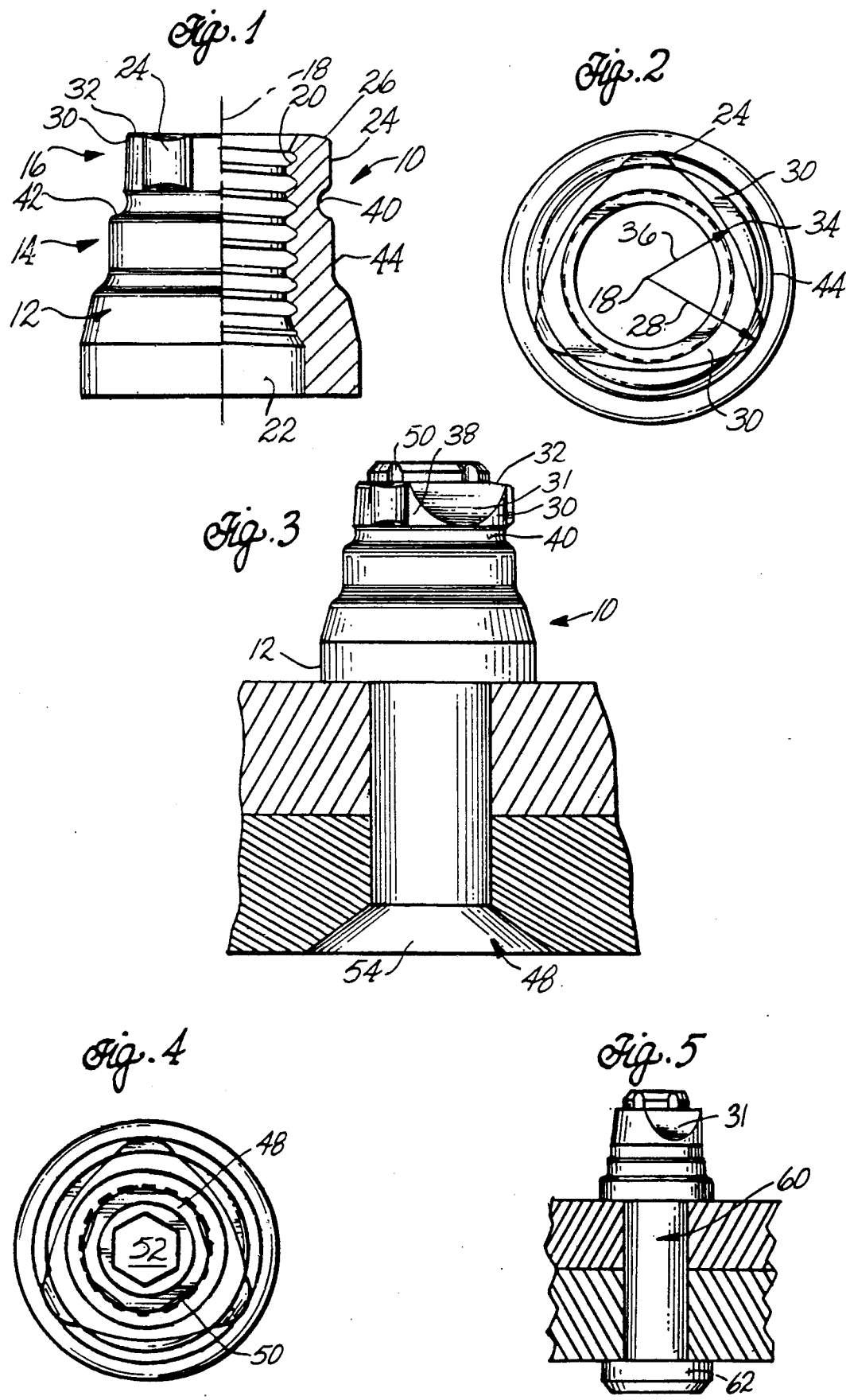

SELF-LOCKING FASTENER, FASTENER SYSTEM, AND PROCESS

BACKGROUND OF THE INVENTION

The present invention relates to fasteners in general, and, more in particular, to fasteners that lock when set and that develop a predetermined clamp-up load while being set.

Threaded fasteners consist of an internally threaded fastener or nut and an externally threaded fastener or bolt. The nut has internal threads that thread onto external threads of the bolt. Wrenching surfaces of the nut and bolt accept torque to form a joint where the fasteners hold one or more workpieces, often called sheets, tightly together. Another name for a bolt is a threaded pin, and a nut is sometimes referred to as a collar.

Many environments in which fasteners are used require that the fasteners have extremely high integrity and strength. Use in aircraft is an example of such an environment. Fasteners must often bear loads not only along their longitudinal axis, but radially of the axis. More particularly, when fasteners join together two or more sheets and the sheets are loaded in their planes with different loads, one sheet tends to slide over the other. Fasteners passing through both sheets become loaded in shear during their resistance to this type of loading. Axial loads arise by the clamping of fastened sheets between a head of the pin on one side of the sheets and the collar on the other side of the sheets.

Fasteners quite often must respond as well in environments where they are cyclically stressed under conditions that could give rise to fatigue failure. A fastener with adequate clamp-up load on it tends to resist fatigue failure.

An obviously desirable feature of a fastener is that it does not come apart in service. Various locking devices exist that keep nuts and bolts together. One deforms the thread of the nut so that it bears in radial compression against the thread of the pin. The resistance to unthreading in this lock is purely frictional. The thread is commonly deformed at the factory in preference to the field, but field deformation has also been practiced. This type of thread lock is known as a prevailing torque thread lock.

Knowledge of the clamping load the fastener applies to a structure is also desirable. Clamp-up load correlates to the resistance of a nut to further tightening onto a bolt and against the sheets. As a clamp-up force increases, the resistance to further tightening increases, and the torque required to turn the nut increases. This fact has been used in fasteners to develop a predetermined clamp-up load.

U.S. Pat. No. 4,260,005 to Edgar Stencel discloses a self-locking collar or nut that uses external lobes to accept a wrenching tool to tighten the nut on a cooperating bolt or pin. Once a predetermined axial load exists in the joint being made, the lobes plastically deform and wrenching can no longer take place. The lobes displace material radially inward of them into and across the thread or flutes of the cooperating bolt to produce a thread lock. The thread lock results from net material deforming into and across the pin flutes. When after lobe deformation material of the nut is in the flutes of the pin, a mechanical or interference, thread lock exists. Lobe deformation is a function of setting torque applied through the wrenching tool. The advantages of the Stencel nut include free running threads prior to the forming of a thread lock, a thread lock upon reaching preload, and accurate preload.

The three lobed nut described in the Stencel patent has constant thickness walls between the lobes. In some of these nuts, upon lobe deformation, the walls between the locations of the lobes displace radially outward while the walls in the vicinity of the lobes displace radially inward, changing the shape of the nut from generally cylindrical to triangular. This triangulation enhances the thread lock. The nuts are set by a driver, such as the one described in U.S. Pat. No. 4,742,735 to Edgar Stencel. This driver has a generally triangular or deltoid shape socket. The wall material of the nuts that displaces radially outward upon lobe failure tends to interfere with the walls of the driver. This interference makes the driver "stick" to the nuts, making release of the driver from the nuts difficult.

SUMMARY OF THE INVENTION

The present invention provides a unique locking nut, a fastener system of the nut and a bolt, and a process for their use.

The invention contemplates an improvement in the internally threaded fastener or nut disclosed in U.S. Pat. No. 4,260,005 to Stencel. The nut is used with an externally threaded fastener or pin. As described in the patent, the nut has at least one external lobe that provides purchase for a wrenching tool or driver with a deltoid socket that tightens the nut; upon reaching a predetermined preload, the lobe deforms, preventing further wrenching and forcing nut material radially inward to deform an internal thread of the nut into a locking relationship with a bolt or pin. The walls between the lobes have a reduced outer radius. Upon the deformation of the lobes, the reduced outer radius walls can still displace radially outward, but they are constrained by having a smaller radius and do not move enough to interfere with the walls of the deltoid driver. Because the nut does not interfere with the walls of the deltoid driver at the completion of a joint, the nut readily releases from the driver. The reduction in the outer radius can increase the amount of inward deformation of the nut at the lobes and increases the mechanical lock.

Preferably, an external taper on each wall of the nut between lobes provides the reduced outer radius and reduced wall thickness. The taper ends at an axial location within the axial span of the nut thread. The tapered wall satisfactorily reduces radial displacement of the wall and eliminates wall interference with the driver and the sticking of the nut to the driver. The tapered wall terminating in the threaded section of the nut avoids sticking, while maintaining high breakaway torque values. The tapered wall does not adversely affect tensile strength because most of the tensile load is picked up by the first few threads of the nut that are closest to the work, and the wall thickness of the nut at these threads is thick and its hoop strength correspondingly high, unaffected by the taper that ends above them.

Preferably, in addition to the tapered walls, the nut has a base with an outer radius larger than the maximum lobe radius. The lobes are on a barrel of the nut and stop before reaching the base so that a gap or relief exists between the lobes and the base. This gap frees the lobes from influence by the base and permits the lobes to deform independently of the base, increasing the accuracy of preload. During setting, a deltoid wrenching driver bears against the lobes with a radial component of force, a component of force in the direction of the axis of the nut. When the resistance to rotation of the nut increases to a predetermined level after the nut engages the surface of the work, the lobes yield in radial compression and displace nut material radially inward of the lobes into locking engagement with the bolt. When the lobes yield, barrel material in the zone of the lobes moves radially inward to contribute to the lock; with three lobes, the barrel triangulates, with the walls between lobes and adjacent to them displacing radially inward and the middle of such walls displacing radially outward.

In a presently preferred detailed embodiment of the invention, the nut has a barrel containing an internally threaded, right cylindrical bore and a base containing a larger diameter counterbore. A bolt or pin cooperates with the nut and can have a manufactured head or it can be a stud. A plurality of axially extending lobes, a convenient number is three, equally spaced lobes, on the outside of the barrel of the nut and radially outward of the nut thread are the lobes that fail in radial compression and cause the deformation that in a three lobed nut is the triangulation. A gap or relief separates the lobes from the base. The barrel walls between the lobes each has an outside taper diverging from the top of the barrel toward the base. The taper can end within the barrel at about the inner axial end of the lobes and run out in the gap or relief. The taper reduces the outer radius of the wall that it is in, with the radius getting larger progressively from the top of the nut. A driver has wrenching surfaces that bear against these lobes to thread the nut onto the bolt or pin, and then to fail the lobes in radial compression and displace material of the nut radially inward of the lobes against the bolt or pin. The geometrical relationship between the surface of the lobes and the wrenching surfaces is the same for each lobe so that each lobe and its backing material radially inside of it yield at the same applied torque. Void cavities or volumes on the bolt or pin, formed, for example, by flats or flutes, receive radially displaced material to form a thread lock. In many applications, just the displaced material against the bolt or pin thread provides a sufficient thread lock.

Features of the present invention include, an upper, radially extending surface just below the relief between the lobes and the base to cooperate with a complementary surface of the driver to pilot the driver. The fastener components can have desired corrosion inhibiting surfaces and lubrication. Chemical film corrosion inhibiting surface coatings, such as alodine, coupled with a suitable dry film lubricant overcoating, work well.

These and other features, aspects and advantages of the present invention will become more apparent from the following description, appended claims and drawings.

BRIEF DESCRIPTION OF THE FIGURES

FIG. 1 is an elevational view of the preferred nut of the present invention with the right half being in section;

FIG. 2 is a top plan view of the nut of FIG. 1;

FIG. 3 is an elevational view of the fastener system of present invention that includes the nut of FIGS. 1 and 2 and a conventional pin, together with structure held together by the nut and pin;

FIG. 4 is a top plan view of the system shown in FIG. 3 from the nut end of the joint; and FIG. 5 is a side elevational view of the structure shown in FIG. 3 after a joint has been effected and the lobes of the nut have been displaced radially inward.

DESCRIPTION OF THE PREFERRED EMBODIMENT

FIG. 1 shows a locking nut 10. The nut has a base 12, a barrel 14, a locking section 16 of the barrel, a longitudinal axis 18, an internally threaded bore 20, and a counterbore 22.

Nut 10 also has three axially extending lobes 24. The lobes extend the axial length of the locking section and are integral with the nut. The lobes are spaced at 120° intervals around axis 18. The lobes also have right cylindrical curvature in radial planes. Each lobe has a starting chamfer 26 to center and align a driver used to set the nut. As seen in FIG. 2, each of the lobes has a major radius 28. This radius is greater than any other radius in locking section 16. The lobes determine the preload of a joint made with the nut because they fail at a predetermined preload, as described in U.S. Pat. No. 4,260,005 to Stencel, cited previously. The preload can be determined by the resistance of the locking section to deformation. One convenient way to adjust the value of preload is to adjust the length of the lobes and, consequently, the length of the wall between them.

Locking section 16 has walls 30 between the lobes. As seen best in FIG. 2, the thickness of these walls varies depending on location. The walls are also externally tapered at 31, as seen best in FIG. 3, with the taper diverging from a top 32 axially to the end of the locking section. The walls are thick adjacent the lobes and thin out to their thinnest midway between the lobes that border the particular wall being considered, as indicated by reference number 34 in FIG. 2. Because of the taper, the walls where they are tapered are at their thinnest at the top of the nut and get thicker away from the top. A radius 36 from axis 18 at top 32 to each of the thinnest sections is the shortest radius in the locking section. Radii at axial locations between the top and bottom of the locking section to the thinnest section of the wall at these locations get progressively longer towards the bottom of the locking section. In other words, the walls at their thinnest fall on a line of a right cylindrical cone. This thinning out of the walls reduces the outside radius of the walls, as can be seen in FIG. 2. The reduction in the outside radius keeps the final outer radius of the deformed walls at the setting of the nut small enough to eliminate the sticking problem. As seen best in FIG. 3, walls 30 outside of where they are tapered are of constant thickness and extend circumferentially further at axial locations progressing to the bottom of the locking section, as indicated by reference numeral 38. The walls increase in thickness as the tapers progress to their inner end, increasing the hoop strength of the walls.

Barrel 14 contains the thread of the nut. Lobes 24 and locking section 16 end at circumferential relief 40. A circumferential, frusto-conical, external shoulder 42 on the side of the relief opposite the lobes provides axial bearing for a cooperating surface of a wrenching tool or driver. This shoulder caps a lower section 44 of the barrel. The lower barrel section has the same radius wherever taken. This radius is about the same as the major radius of the lobes, but greater than the rest of the locking section. FIG. 2 shows this best. The thread has a run-in at the top of the barrel, adjacent top 32, that may have a narrower included angle than usual, 60° instead of 120°.

Base 12 and counterbore 22 function as they do in the prior art. The counterbore accepts imperfect thread run-out of a pin or bolt, makes it possible for the fastener to accommodate grip variations resulting from different thickness workpieces, and provides a nut that has lower unit loading on the sheets because axial preload is spread over a greater area.

Relief 40 uncouples the lobes from the base. The relief is at the internal axial end of the lobes and separates the lobes from nut material that would prevent the lobes from failing uniformly along their length. In the illustrated embodiment, the relief separates the lobes from the base. As pointed out in the "Background of the Invention" section of this specification, the accuracy of preload sometimes is affected by the base in the nut explicitly described in U.S. Pat. No. 4,260,005 to Stencel where the base and lobes connect directly. This union of the lobes with the base strengthens the lower portions of the lobes adjacent to the base; consequently, the lobes fail progressively with the top portion of the lobes failing before the bottom portions. This skews the wrenching surface of the lobes out of alignment with the axis of the nut, and creates a surface that tended to cam the driver off the nut, a surface at an angle to the axis of the nut. The relief eliminates this coupling and solves the problem of possible variation of preload because the nut material at the interior axial end of the lobes is not strengthened by the base.

The thread of the nut is standard. The run-in of the thread at the base end of the nut may begin as a transition from counterbore 22 to the thread in the manner of U.S. Pat. No. 4,842,466 to Rath and Wheeler. The nut material may be standard 7075 aluminum alloy, for example Grip accommodation may also be standard, say 1/16th of an inch. The number of lobes is preferably three, but need not be. Three lobes provide enough material for effective engagement by the wrenching tool that could be a problem with more lobes. Two lobes work, but increases the amount of material that must be plastically deformed for a given preload. The curvature of the outside surface of the lobes should be the same for all lobes and such that radial inward failure occurs, as opposed, for example, to circumferential.

With reference to FIG. 3, a fastener system in accordance with the present invention is shown. There, nut 10 is received on a male threaded fastener in the form of a threaded pin 48 of standard configuration except for axially extending flats 50 that extend axially in the thread of the pin and which provide space for the material of the lobes to enter to form a mechanical lock, in the manner described in the '005 Stencel patent. The number of flats relative to the number of lobes is such that all the lobes cannot line up between flats at lobe failure, and some of the material of at least one of the lobes can enter the flat to effect the mechanical lock. Presently, it is preferred to provide five flats in the pin with three lobes on the collar. As is standard, the pin has a hexagonal wrenching recess 50 at its threaded end, shown in FIG. 4, and a manufactured head 52.

In FIG. 3, the nut has been threaded onto the pin with the base of the nut bearing on an upper sheet 56 of a joint. The sheet cooperates with a lower sheet 58, manufactured head 54 of pin 48, and nut 10 to form the joint, the sheets being loaded in compression between the nut and the manufactured head of the pin. As wrenching progresses, the load on the lobes increases and eventually the lobes plastically fail in radial compression and move radially inward of the barrel, displacing material inside of the lobes against the thread of the pin and into the flutes to effect the lock.

As described in the Stencel '005 Patent, the lobes provide for wrenching the nut onto a cooperating pin by providing the purchase for a wrenching tool or driver, a generally deltoid shaped socket, for example, shown in U.S. Pat. No. 4,742,735 to Stencel. As wrenching progresses, resistance to wrenching increases, and this resistance correlates to the load the fastener applies on a joint. Eventually the load becomes high enough that the lobes and the walls between them plastically deform. The lobes, and the wall portion immediately adjacent to the lobes, move radially inward, while the wall portion between the lobes moves radially outward, creating a locking relationship with the cooperating pin.

The taper reduces the radius of the walls from what they would be if the walls were at the same radius as at the base of the lobes. The taper also reduces the strength of the walls over the strength that they would otherwise be. Accordingly, upon lobe failure the material of the nut at the lobes will move plastically radially inward to lock securely with the cooperating bolt or pin. In the typical case, inward deformed material will include the portions of walls 30 contiguous with the lobes. The walls more centrally between the lobes plastically deforms radially outward. Because the radius of the walls in these locations is smaller, the amount of radial movement will not be enough to cause the walls to interfere with the adjacent walls of the driver, and the nut will not stick to the driver. The amount of deformation reduces as the taper runs from the top of the nut to the end of the taper. The tensile strength of the joint is unaffected by the taper that runs out well before the nut thread convolutions that bear the greater tensile load of the joint.

A completed joint is shown in FIG. 5 with the lobes deformed. The joint in FIG. 5 has a preload correlated with the deformation of the lobes, a preload that can be closely controlled. The pin shown in FIG. 5 at 60 has a protruding head 62.

The present invention has been described with reference to a preferred embodiment. The spirit and scope of the appended claims should not, however, necessarily be limited to the description.

We claim:

1. A nut of the type having a longitudinal axis comprising:
   an internal threaded bore;
   a barrel portion surrounding at least a portion of the thread; and
   three spaced apart longitudinally extending lobes along an external surface of the barrel, each of the lobes having a right cylindrical surface parallel to the axis of the nut for providing a wrenching surface for a wrenching driver and deforming in radial compression when the nut is tightened on a cooperating threaded fastener against a workpiece at a predetermined axial load on the nut developed by the workpiece, upon such deformation the lobes substantially merging into the body of the nut for eliminating the wrenching surface and terminating tightening of the nut against the workpiece; and wherein
   a portion of the barrel walls in between the lobes has a constant thickness, and the barrel walls have an outer radius from the axis of the nut at all points between the lobes sufficiently less than the minimum radius from the axis to each of the lobes that when the lobes deform, the barrel walls between the lobes deform radially outwardly an insufficient distance to interfere with the driver.

2. An improvement in a nut of the type having a longitudinal axis, an internal axial bore, an internal thread in the wall of the bore, a barrel containing at least a portion of the thread, spaced apart axial protruding lobes extending along an external surface of the barrel, and a base, the lobes providing purchase for a wrenching driver and deforming in radial compression when the nut is tightened on a cooperating threaded fastener against a workpiece at a predetermined axial load on the nut developed by the workpiece, upon such deformation the lobes substantially merging into the body of the nut with the material of the lobes moving radially inward into the body of the nut to eliminate purchase for the wrenching tool and terminate tightening of the nut against the workpiece, the improvement comprising:

the barrel walls circumferentially of the lobes having an outer radius from the longitudinal axis less than the minimum radius from the longitudinal axis to each of the lobes such that when the lobes deform, the barrel walls circumferentially of them deform radially outward, but do not interfere with the driver, and wherein the barrel walls circumferentially of the lobes have a taper beginning at the top of the nut and ending between the top of the nut and the base, the taper providing the outer radius less than the minimum radius.

3. The improvement claimed in claim 2 wherein there are three lobes, each ending at an inner end between the axial ends of the nut, a counterbore in the base having a radius greater than the axial bore, and an external relief between the inner end of each lobe and the balance of the nut so that the strength of each lobe in resistance to the wrenching driver is independent of nut material adjacent the inner ends of the lobes.

4. The improvement claimed in claim 3 wherein the external surface of the lobes is convexly curved in planes at right angles to the axis of the nut.

5. The improvement claimed in claim 4 wherein the external surface of the lobes is right cylindrical.

6. An improved fastening system of the type having a threaded male fastener and a self-locking nut, the nut being of the type having a longitudinal axis, an internal axial bore, an internal thread in the wall of the bore, a barrel containing at least a portion of the thread, a plurality of circumferentially spaced apart, axially extending lobes extending along an external surface of the barrel, a base having an outside radius greater than the minimum radius from the longitudinal axis of each of the lobes, and a counterbore in the base having a radius greater than the radius of the axial bore, the lobes providing purchase for a wrenching tool and deforming in radial compression when the nut is tightened on the male fastener against a workpiece at a predetermined axial load on the nut developed by the workpiece, upon such deformation the lobes plastically deform radially inward and merge into the body of the nut to eliminate purchase for a wrenching tool and terminate tightening of the nut, an improvement comprising:

the walls of the barrel circumferentially of the lobes having an outer radius before deformation sufficiently smaller than the minimum radius from the longitudinal axis to the lobes that the wrenching tool can be removed from the nut after deformation of the lobes without interference by the walls of the barrel, and wherein the smaller radius of the walls between lobes is provided by an outer taper on each of the walls that merges into the barrel at an inner axial end, the radius of the barrel to such inner taper ends being the same as the minimum radius from the longitudinal axis to the lobes.

7. The improvement claimed in claim 6 wherein the external surface of the lobes is right cylindrical.

8. A nut of the type having a longitudinal axis comprising:

an internal threaded bore;

a barrel portion surrounding at least a portion of the thread; and spaced apart longitudinally extending lobes along an external surface of the barrel for providing a wrenching surface for a wrenching driver and deforming in radial compression when the nut is tightened on a cooperating threaded fastener against a workpiece at a predetermined axial load on the nut developed by the workpiece, upon such deformation the lobes substantially merging into the body of the nut for eliminating the wrenching surface and terminating tightening of the nut against the workpiece; and wherein the barrel walls in between the lobes have a taper beginning with a smaller radius at the upper end of the nut and ending with a larger radius between the upper end of the nut and the lower end of the nut, the taper providing an outer radius from the axis of the nut sufficiently less than the minimum radius from the axis to each of the lobes that when the lobes deform, the barrel walls between the lobes deform radially outwardly an insufficient distance to interfere with the driver.

9. An improvement in a self-locking nut used with a male fastener having external threads to make a joint with at least one sheet, the nut having a barrel at one end and a contiguous base at the other end, a longitudinal axis, and an axial bore, an internal thread in the axial bore for threaded receipt on the external thread of the male fastener, at least one lobe on the outside of the barrel for engagement by a wrenching tool and deformation in radial compression upon the application of a predetermined load thereon by the wrenching tool in conjunction with the sheet, the lobe having an external surface for engagement by the wrenching tool that parallels the axis of the bore, the nut radially inward of the lobe and the lobe being plastically deformable such that upon sufficient tightening of the nut by the tool on the male fastener and against the sheet that a predetermined preload develops at which each lobe deforms radially inward and displaces material of the barrel ahead of the deforming lobe into the axial bore and against the male fastener to form a thread lock, the base having a counterbore opening into the axial bore, the counterbore having a radius greater than the radius of the wall of the bore, the counterbore accommodating imperfect thread run-out of the male fastener and grip variation, the improvement comprising:

the barrel wall circumferentially of each lobe having a reduced outer radius from the longitudinal axis such that when each lobe deforms the barrel wall circumferentially of it deforms radially outward, but does not interfere with the tool, and wherein the barrel wall circumferentially of each lobe has an external taper from the top of the barrel diverging downwardly, the taper providing the reduced outer radius.

10. The improvement claimed in claim 9 wherein the barrel has a top and the thread a run-in at the top with an included angle substantially less than 120°.

* * * * *